United States Patent
Mcisaac et al.

(10) Patent No.: US 11,879,493 B2
(45) Date of Patent: Jan. 23, 2024

(54) SPLIT NUT

(71) Applicant: Gordian Enterprises Inc., Beaumont (CA)

(72) Inventors: Frank Mcisaac, Beaumont (CA); Paul Clements, Leduc County (CA)

(73) Assignee: Gordian Enterprises Inc., Beaumont (CA)

( * ) Notice: Subject to any disclaimer, the term of this patent is extended or adjusted under 35 U.S.C. 154(b) by 674 days.

(21) Appl. No.: 16/885,647

(22) Filed: May 28, 2020

(65) Prior Publication Data

US 2020/0378431 A1    Dec. 3, 2020

(30) Foreign Application Priority Data

May 29, 2019   (CA) ..................................... 3044632

(51) Int. Cl.
*F16B 39/36*    (2006.01)
*F16B 37/08*    (2006.01)

(52) U.S. Cl.
CPC ................ *F16B 37/0892* (2013.01)

(58) Field of Classification Search
CPC ...... F16B 39/26; F16B 37/0892; F16B 39/36; F16B 37/0864
USPC .......................................... 411/278, 267, 433
See application file for complete search history.

(56) References Cited

U.S. PATENT DOCUMENTS

| | | | | |
|---|---|---|---|---|
| 1,006,190 A | * | 10/1911 | Estell et al. | F16L 37/1215 279/7 |
| 1,475,907 A | * | 11/1923 | Volman | F16B 37/0864 279/7 |
| 1,607,274 A | * | 11/1926 | Hecht | F16B 39/36 411/432 |
| 3,352,341 A | * | 11/1967 | Schertz | F16B 37/0864 411/270 |
| 3,813,984 A | | 6/1974 | Selinder | |
| 4,014,058 A | | 3/1977 | Lee | |

(Continued)

FOREIGN PATENT DOCUMENTS

| | | |
|---|---|---|
| AU | 474920 A | 8/1976 |
| CA | 1170871 A | 7/1984 |

(Continued)

OTHER PUBLICATIONS

GN 6333 Quick Action Hexagon Nuts; Product description: 1-2; downloaded from www.jwwinco.com (Apr. 9, 2019).

*Primary Examiner* — Victor D Batson
*Assistant Examiner* — Dil K. Magar
(74) *Attorney, Agent, or Firm* — Merchant & Gould P.C.

(57) ABSTRACT

A split nut with an outer body and an inner body formed of two jaws for gripping a threaded rod. The outer body has an inner surface defining tapered axial channel and includes a separator between the jaws to guide the jaws against an inner surface of the tapered axial channel. The inner surface can be circular in cross section and the outer body can also have an outer surface be circular in cross section. A lock is arranged to lock the jaws in an axial position at which the jaws are sufficiently close to force the jaws into threaded engagement with the threaded rod. The lock can also lock the jaws in an additional axial position at which the threaded rod can be moved freely axially between the jaws. The lock can comprise a locking pin movable within the outer body into respective slots corresponding to each locking position.

61 Claims, 9 Drawing Sheets

(56) References Cited

U.S. PATENT DOCUMENTS

| | | | |
|---|---|---|---|
| 4,078,470 A | 3/1978 | Zeranick, Jr. et al. | |
| 4,082,468 A | 4/1978 | von Base | |
| 4,083,288 A | 4/1978 | Williams | |
| 4,332,169 A | 6/1982 | Stuart | |
| 4,462,731 A | 7/1984 | Rovinsky et al. | |
| 4,531,872 A | 7/1985 | Warkotsh | |
| 4,721,025 A | 1/1988 | Chang | |
| 4,768,909 A | 9/1988 | Warkotsch | |
| 4,923,349 A | 5/1990 | Logsdon | |
| 5,000,640 A | 3/1991 | Haas, Jr. | |
| 5,032,048 A | 7/1991 | Walton et al. | |
| 5,152,651 A | 10/1992 | Artéon | |
| 5,282,709 A | 2/1994 | Chaput et al. | |
| 5,340,252 A * | 8/1994 | Weddendorf | F16B 37/0864 411/433 |
| 5,779,418 A | 7/1998 | Ying-Che | |
| 5,826,847 A * | 10/1998 | Warner | F16B 7/1463 248/200.1 |
| 5,902,085 A * | 5/1999 | Yuta | F16B 37/0857 411/908 |
| 5,921,734 A | 7/1999 | Kataoka | |
| 5,944,467 A * | 8/1999 | Yuta | F16B 37/0842 411/57.1 |
| 6,007,284 A * | 12/1999 | Taneichi | F16B 37/0857 411/270 |
| 6,733,275 B2 | 5/2004 | Fujita | |
| 6,799,930 B1 | 10/2004 | More et al. | |
| 6,821,070 B1 | 11/2004 | Thompson | |
| 6,884,015 B1 | 4/2005 | Takegawa | |
| 6,974,291 B2 * | 12/2005 | Li | F16B 37/0864 411/429 |
| 7,127,791 B2 | 10/2006 | Barringer et al. | |
| 7,179,038 B2 * | 2/2007 | Reindl | F16B 37/0864 411/188 |
| 7,331,745 B2 * | 2/2008 | Giehl | F16B 37/0864 411/433 |
| 7,338,242 B2 | 3/2008 | Ellis et al. | |
| 7,416,375 B2 * | 8/2008 | Virdee | F16B 37/0864 411/433 |
| 7,500,412 B1 | 3/2009 | Maciejewski | |
| 7,744,322 B2 * | 6/2010 | Taneichi | F16B 37/0857 411/533 |
| 8,061,945 B2 * | 11/2011 | Smith | F16B 37/0842 411/433 |
| 8,206,072 B2 | 6/2012 | Wagner | |
| 8,257,004 B2 * | 9/2012 | Smith | F16B 37/0857 403/109.5 |
| 8,262,332 B2 | 9/2012 | Poppe et al. | |
| 8,398,351 B2 | 3/2013 | Tohmann et al. | |
| 8,439,620 B2 | 5/2013 | Mellyn | |
| 8,540,471 B2 | 9/2013 | Dvorak | |
| 8,646,339 B2 * | 2/2014 | Smith | F16B 31/028 411/433 |
| 8,708,629 B2 * | 4/2014 | Smith | F16B 39/32 411/433 |
| 8,911,192 B2 | 12/2014 | Hohmann et al. | |
| 9,163,655 B2 * | 10/2015 | Taneichi | F16B 43/00 |
| 9,574,598 B1 | 2/2017 | Carmichael et al. | |
| 9,746,018 B2 | 8/2017 | Williams et al. | |
| RE48,981 E * | 3/2022 | Taneichi | F16B 37/0857 |
| 2001/0025181 A1 | 9/2001 | Freedlan | |
| 2005/0191153 A1 | 9/2005 | McIntyre et al. | |
| 2005/0238460 A1 | 10/2005 | Li | |
| 2007/0017083 A1 | 1/2007 | Ito | |
| 2007/0207010 A1 | 9/2007 | Caspi | |
| 2008/0279623 A1 | 11/2008 | McGlasson et al. | |
| 2010/0158635 A1 * | 6/2010 | Rodman | F16B 37/0864 411/432 |
| 2010/0166525 A1 | 7/2010 | Dvorak | |
| 2010/0310338 A1 | 12/2010 | Diez Herrera | |
| 2011/0085876 A1 | 4/2011 | Wagner | |
| 2011/0182697 A1 * | 7/2011 | Smith | F16B 37/0857 411/433 |
| 2018/0073615 A1 | 3/2018 | Wixey | |
| 2019/0032822 A1 | 1/2019 | Vreugde | |

FOREIGN PATENT DOCUMENTS

| | | | |
|---|---|---|---|
| CN | 101975212 A | 2/2011 | |
| CN | 201934472 U | 8/2011 | |
| CN | 202021781 U | 11/2011 | |
| CN | 202215557 U | 5/2012 | |
| CN | 203214547 U | 9/2013 | |
| CN | 103603861 A | 2/2014 | |
| CN | 104265748 A | 1/2015 | |
| CN | 105909656 A | 8/2016 | |
| CN | 206605122 U | 11/2017 | |
| CN | 108119500 A | 6/2018 | |
| CN | 207634491 U | 7/2018 | |
| CN | 207728704 U | 8/2018 | |
| CN | 207814179 U | 9/2018 | |
| CN | 208322654 U | 1/2019 | |
| CN | 208409109 U | 1/2019 | |
| DE | 1962009 A1 * | 6/1971 | F16B 37/0892 |
| DE | 202005005501 U1 | 6/2005 | |
| DE | 102011108934 A1 | 1/2013 | |
| EP | 0408239 * | 7/1990 | F16B 37/0892 |
| EP | 0408239 A1 | 1/1991 | |
| EP | 0615073 A1 | 9/1994 | |
| EP | 0912390 A1 | 5/1999 | |
| EP | 1108902 A1 | 6/2001 | |
| EP | 1452284 A1 | 9/2004 | |
| EP | 2072842 A2 | 6/2009 | |
| EP | 2737222 A1 | 6/2014 | |
| FR | 2537673 A1 | 6/1984 | |
| GB | 736008 A | 8/1955 | |
| GB | 994650 A | 6/1965 | |
| GB | 2196947 A | 5/1988 | |
| GB | 2349678 A | 11/2000 | |
| GB | 2402965 A | 12/2004 | |
| GB | 2469829 A | 11/2010 | |
| GB | 2506187 A | 3/2014 | |
| GB | 2556614 A | 6/2018 | |
| GB | 201815059 | 10/2018 | |
| JP | 2858150 B2 | 11/1991 | |
| JP | 2008-267472 A | 11/2008 | |
| JP | 2015-166624 A | 9/2015 | |
| JP | 2015-209971 A | 11/2015 | |
| JP | 2016-161130 A | 9/2016 | |
| KR | 200150866 Y1 | 7/1999 | |
| KR | 20100005961 U | 6/2010 | |
| KR | 20150049522 A | 5/2015 | |
| KR | 20180028576 A | 3/2018 | |
| PL | 413448 A1 | 2/2017 | |
| TW | 534262 U | 12/2016 | |
| WO | 01/88390 A1 | 11/2001 | |
| WO | 03/025405 A1 | 3/2003 | |
| WO | 2004/070218 A1 | 8/2004 | |
| WO | 2009/068959 A1 | 6/2009 | |
| WO | 2013/113768 A1 | 8/2013 | |
| WO | 2016/192931 A1 | 12/2016 | |

* cited by examiner

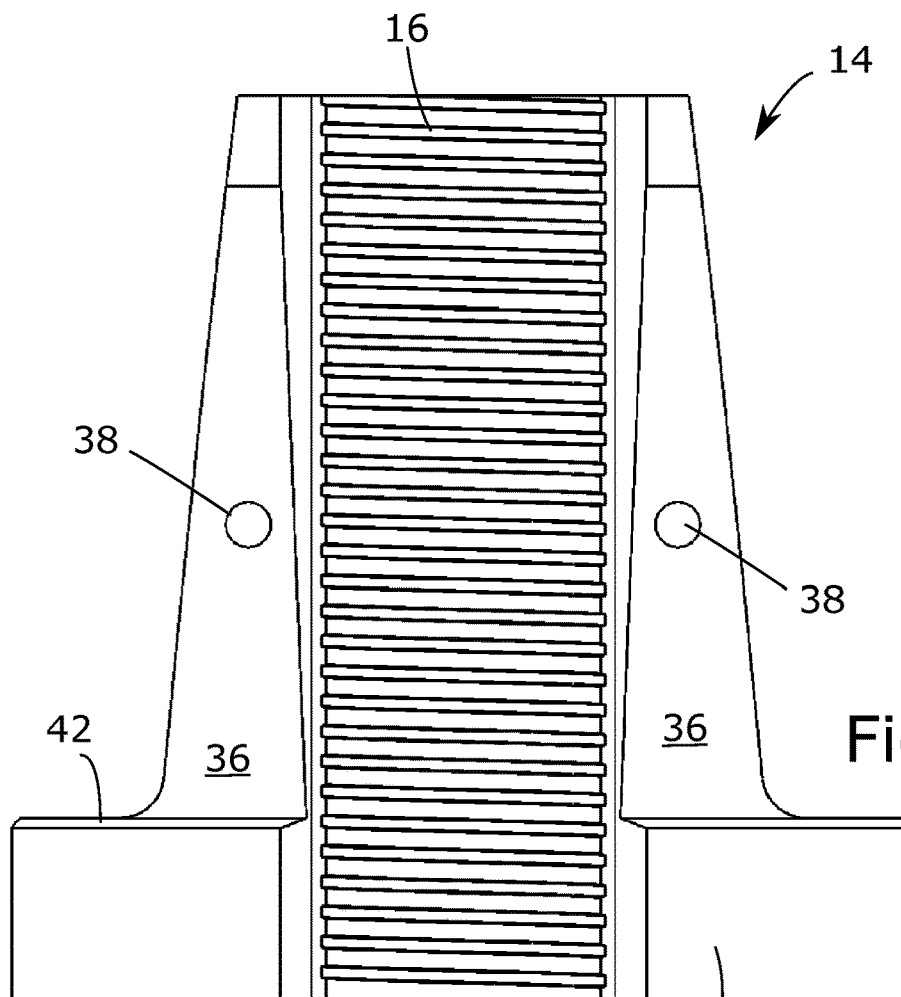
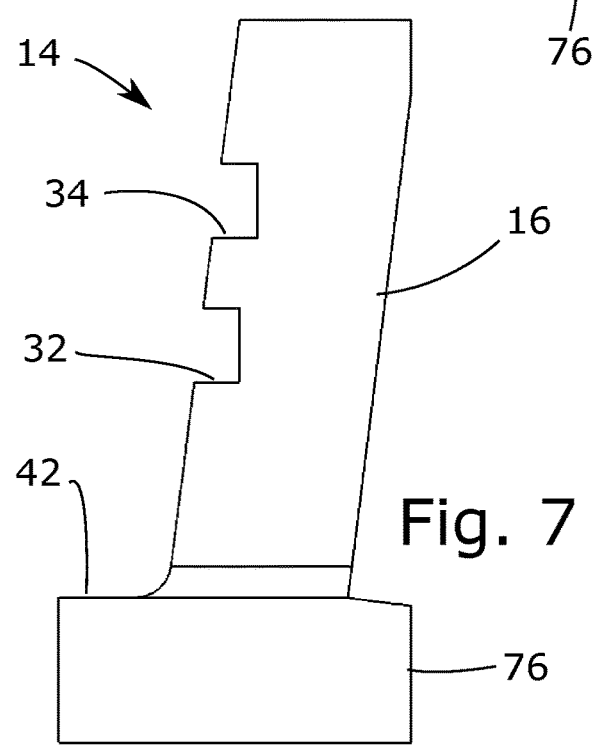

SPLIT NUT

TECHNICAL FIELD

Split Nuts

BACKGROUND

A nut is a threaded element attached around a threaded rod. A split nut allows attachment of the nut to the threaded rod without the need to laboriously thread the nut from an end of the rod. When used with installation or repair tools, there is a need for a split nut that is attachable to, and detachable from, a threaded rod using one hand operation, safely and without damage to the split nut.

SUMMARY

There is provided a nut for attachment on a threaded rod. The nut has an outer body having an inner surface defining a tapered axial channel. An inner body is arranged within the tapered axial channel and split into at least two jaws in an axial direction. The jaws are axially movable within the tapered axial channel. The outer body includes a separator arranged between the jaws to guide the jaws against the inner surface of the tapered axial channel. This causes the jaws to move radially outward as they move axially outward from the outer body. The inner body has an axial internal thread. A lock is arranged to lock the jaws in an axial position at which the jaws are sufficiently close to force the inner body into threaded engagement with the threaded rod.

In various embodiments, there may be included any one or more of the following features. The tapered axial channel may be generally circular in cross section. The inner surface of the outer body may be shaped as a truncated cone. The inner body may have an outer surface generally corresponding in shape to the inner surface of the outer body. The outer body may have an outer surface that is generally circular in cross section. The outer surface of the outer body may be cylindrical in shape. There may be a locating connector connected between the jaws. The locating connector may include an alignment pin extending between the jaws. The separator may define a recess arranged around the alignment pin, axial motion of the jaws within the outer body being constrained by contact of the alignment pin with the separator. The separator may bear against axially tapered circumferentially-facing surfaces of the jaws. The separator may have axially tapered circumferentially-facing surfaces corresponding to and bearing against the axially tapered circumferentially-facing surfaces of the jaws. The jaws may each have a respective flange extending radially outward axially outside of an end of the outer body at which the tapered axial channel is widest. The lock may include a locking pin movable within the outer body and arranged for insertion into a slot in the inner body when the jaws are in the axial position at which the jaws are sufficiently close to force the inner body into threaded engagement with the rod. The lock may have a spring arranged to bias the locking pin into the slot in the inner body when the jaws are in the axial position at which the jaws are sufficiently close to force the inner body into threaded engagement with the threaded rod. The locking pin may be part of a first end of a first class lever, a second end of the first class lever forming a button extending out of an outer surface of the outer body when the locking pin is inserted into the slot in the inner body. The lock may also be arranged to lock the jaws in an additional axial position at which the threaded rod can be moved freely axially between the jaws. Where the lock has a slot corresponding to one locking position, additional locking positions may correspond to additional slots.

These and other aspects of the device and method are set out in the claims.

BRIEF DESCRIPTION OF THE FIGURES

Embodiments will now be described with reference to the figures, in which like reference characters denote like elements, by way of example, and in which:

FIG. 6 is a view of the jaw of FIG. 5 from the same direction as the section plane of FIG. 4.

FIG. 7 is a front view of the jaw of FIGS. 5-6 from a perpendicular direction from the view of FIG. 6, and corresponding to the cutaway plane of FIGS. 1-3.

DETAILED DESCRIPTION

Immaterial modifications may be made to the embodiments described here without departing from what is covered by the claims.

Figure 1:
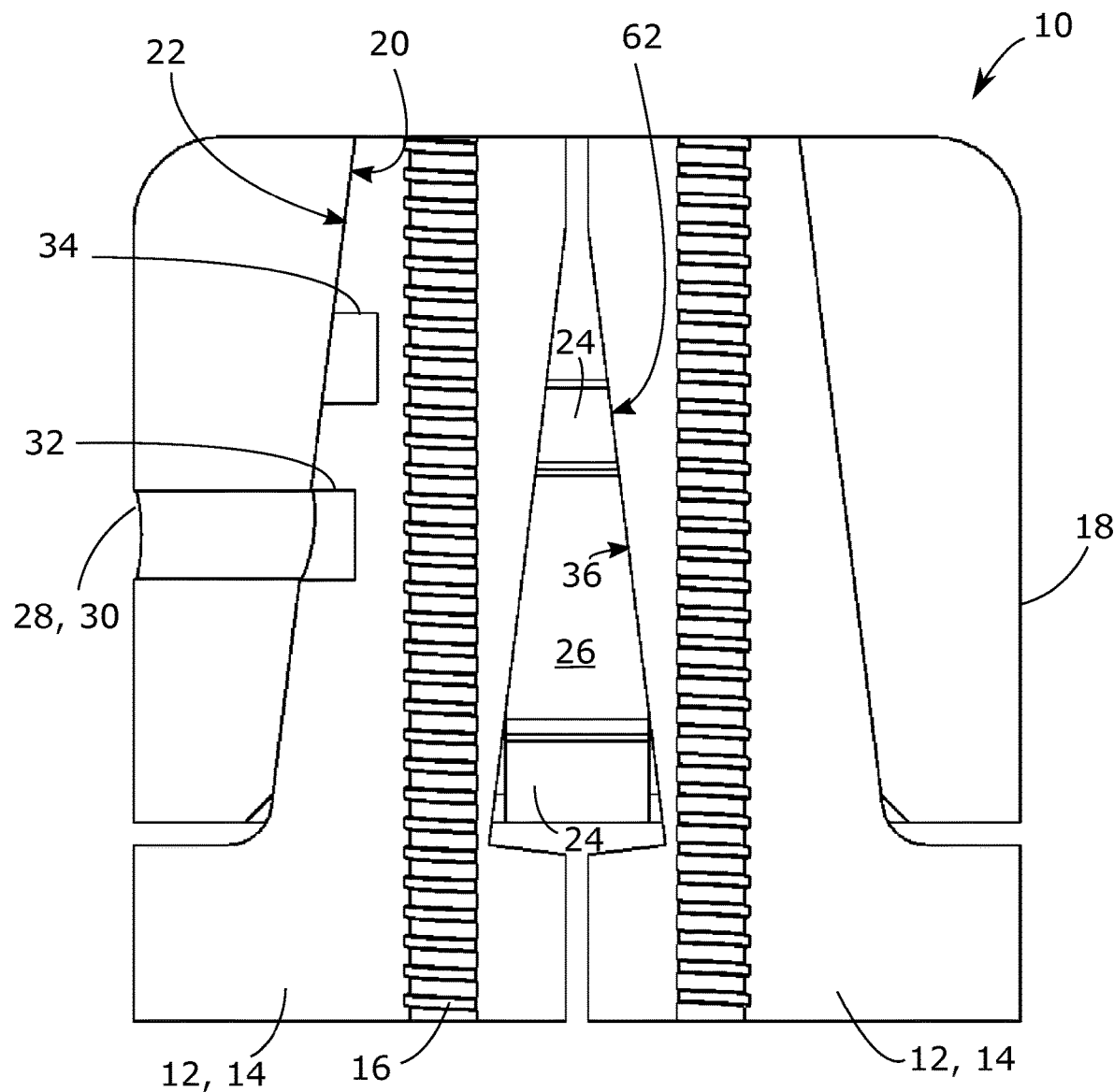
FIG. 1 is a front cutaway view of a split nut with jaws in a closed position and showing a separator between the jaws.

FIG. 1 shows a cutaway view of a split nut 10. A vertical direction in this figure corresponds to an axial direction. The view is from a direction perpendicular to the axial direction which will be referred to as the front direction. The split nut has an inner body 12 split into two jaws 14 in the axial direction. The inner body 12 has an axial internal thread, here formed by axial thread portion 16 on each of the two jaws. The nut also has an outer body 18, here shown on either side of the inner body, but in fact extending circumferentially around the inner body in this embodiment. The outer body has an inner surface 20 that defines a tapered axial channel. The inner body 12 is arranged within the tapered axial channel and in this embodiment has an outer surface 22 generally corresponding in shape to the inner surface 20 of the tapered axial channel. The jaws 14 are axially movable within the tapered axial channel.

A separator 24 between the jaws 14 separates the jaws 14 to guide them against the inner surface 20 defining the tapered axial channel. The separator 24, along with the tapered axial channel, causes the jaws to move radially together or apart depending on their axial position. It can also prevent circumferential motion of the jaws which could otherwise be allowed by a tapered axial channel which is generally circular in cross section. The separator 24 is in this embodiment attached to the outer body 18, and includes a recess 26 to accommodate an alignment pin (not shown in FIG. 1) connecting the two jaws. The recess and alignment pin are better shown in FIG. 8. The separator in this embodiment has axially tapered circumferentially facing surfaces 62 which bear against and correspond in taper to axially tapered circumferentially facing surfaces 36 of the jaws 14.

Figure 2:
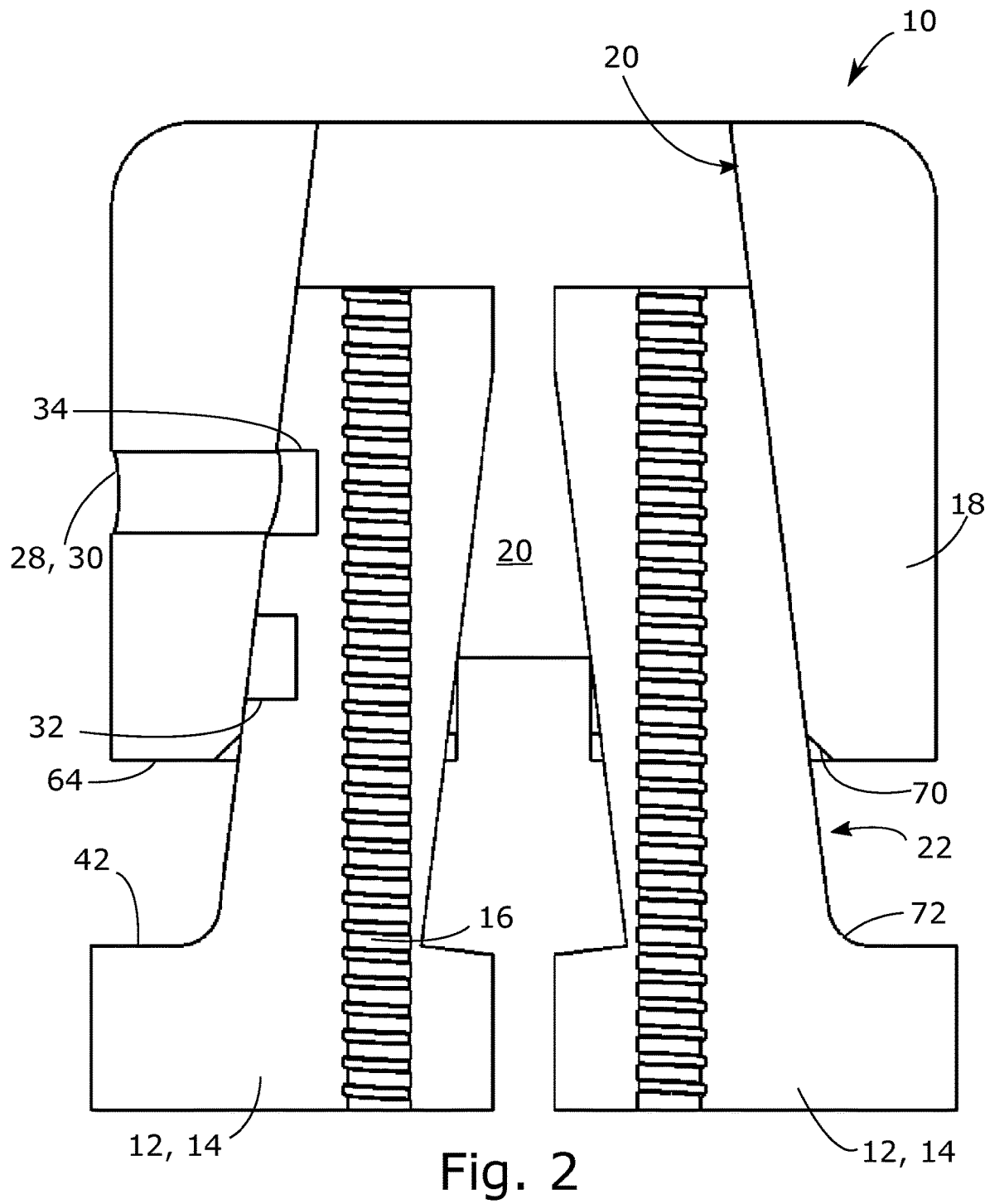
FIG. 2 is a front cutaway view of the split nut of FIG. 1 with jaws in an open position and not showing the separator.

The split nut also has a lock 28. Components of the lock 28 that are movable in the locking operation are shown only in FIG. 9. The lock in this embodiment has a cavity 30 in the outer body 18, for accommodating a locking pin (not shown in FIG. 1, but shown in FIG. 9) that can lock into slots 32 and 34 in the inner body 12. FIG. 1 shows the jaws in an axial position at which the jaws are sufficiently close to force the jaws into threaded engagement with a threaded rod of suitable size, if one were present within the jaws. The cavity 30 is aligned with a first slot 32 in this axial position. The lock 28 is arranged to lock the jaws 14 in this axial position by insertion of the locking pin into the first slot 32 when the jaws are in this axial position. An additional axial position at which the jaws are radially separated by the separator 24 sufficiently that a threaded rod (not shown) can be moved freely axially between the jaws is shown in FIG. 2. At this additional axial position the cavity 30 is aligned with the second slot 34 to allow the locking pin to be inserted into the second slot 34.

FIG. 2 is another front cutaway view of the nut of FIG. 1, but with the cavity 30 aligned with the second slot 34 so that the jaws are locked in an open position. The separator 24 is not shown in FIG. 2 allowing the inner surface 20 of the tapered axial channel to be visible between the jaws 14. The separator in this embodiment is fixed to the outer body 18 and so would have the same position relative to the outer body 18 as shown in FIG. 1.

Each jaw 14 in this embodiment has a flange 42 which extends radially outward from a position axially outside of the end 64 of the outer body at which the tapered axial channel is the widest. The flange 42 bears axial loads on the split nut when the split nut is mounted on a threaded rod. As the flanges 42 are each formed as a single part with the respective jaw 14, the axial force can be transferred through threaded portions 16 to the threaded rod without passing through any movable joints. The flange can also be useful to manipulate the inner body 12 axially with respect to the outer body 18. In the embodiment shown in FIGS. 1-9, there is a gap between the flange 42 and end 64 of the outer body 18 even when the jaws are in the closed position. Bevelled edge 70 on end 64 of the outer body 18 can help prevent contact with optional fillet 72 on the inner body 12. The gap can help prevent axial forces from being transmitted into the outer body by contact of the flange 42 with end 64 of the outer body.

Figure 3:
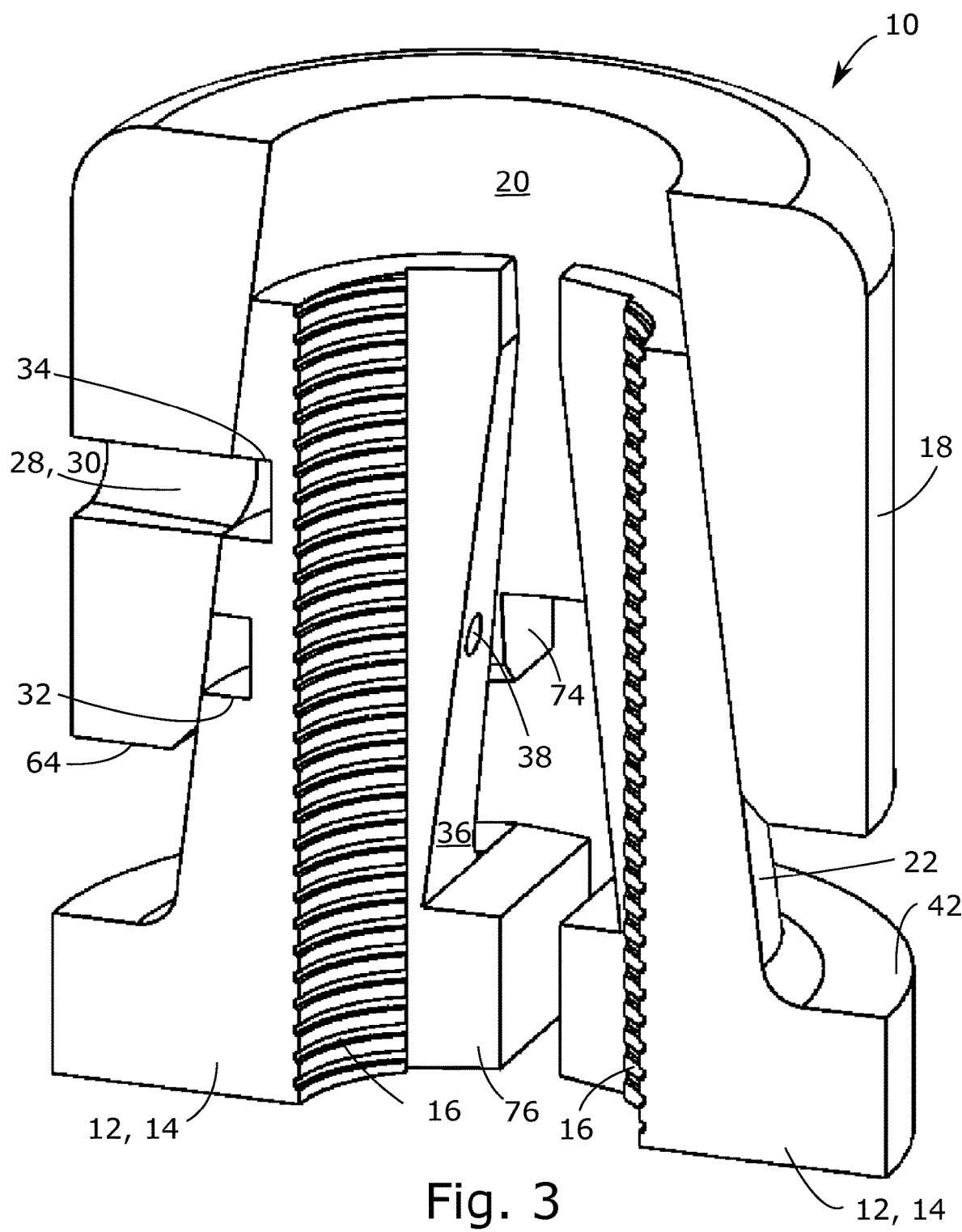
FIG. 3 is a diametric cutaway front view showing the nut of FIGS. 1-2 in the open position as in FIG. 2.

FIG. 3 is a diametric cutaway front view showing the nut in the open position as in FIG. 2. As can be readily seen in FIG. 3, the tapered axial channel in this embodiment is generally circular in cross section, and is in fact shaped as a truncated cone. The inner body has an outer surface 22 of a generally corresponding shape. The circular shape is not necessary for functionality, but is easier to manufacture than shapes with a non-circular cross section. Where the tapered axial channel is conical, as shown in these figures, the outer surface 22 of jaws will not exactly match the shape of the inner surface 20 of the inner body that defines the tapered axial channel, for at least part of the axial motion of the jaws. The outer surface 22 of the inner body in this embodiment corresponds in taper with the inner surface 20 of the outer body, and generally corresponds in shape to the inner surface 20 of the outer body. If a more exact match is desired the walls 20 of the tapered axial channel could be curved axially to more closely resemble a portion of a sphere, so that the jaws rotate into position along the sphere. For a more exact match but retaining linear motion of the jaws as in the embodiment shown in the figures, portions of the inner surface 20 of the outer body 18 could be made to have translational symmetry on portions adjacent to each jaw 14 matching the respective linear motions of the jaws 14, which would require the inner surface 20 not to be fully circular in cross section at some portions of the axial length of the channel.

The jaws 14 have axially tapered circumferentially facing surfaces 36 which the separator 24 (not shown in FIG. 3) bears against in order to keep the jaws adjacent to the inner surface 20 of the tapered axial channel. The jaws 14 may be connected by a locating connector between the jaws, in order to keep the jaws axially together while accommodating relative radial motion. In this embodiment, the locating connector comprises an alignment pin receiving hole 38 on axially tapered circumferential surface 36 for receiving an alignment pin (not shown) extending between the jaws.

FIG. 3, the outer body 18 has an outer surface 58 which in this embodiment is generally circular in cross section, and in fact cylindrical. The outer body could also have different shapes, such as a hexagonal shape to allow the use of a wrench to rotate the nut. However, such rotation of the nut using a wrench is not necessarily needed and the shape circular in cross section is easier to manufacture. For example, the nut may be applied to a threaded rod to allow an axial force to be applied to the threaded rod via the flange 42 of the nut. One example is use of the nut with a hollow hydraulic cylinder for pulling in/out bushings. For other applications, it may be beneficial to allow circumferential force to be applied to the nut. When rotated around a threaded rod, like any other nut an axial motion of the nut may result. This axial motion is triggered by the threaded engagement of the jaws with the threaded rod. The nut may be designed to withstand substantial circumferential forces on the outer body, transmitted to the inner body via the separators 24 bearing against axially tapered circumferentially facing surfaces 36 of the jaws 14. The separators 24 are not shown in FIG. 3, but slot 74 for receiving a separator is shown in FIG. 3. The slot allows the separator to be inset into the outer body 18 so that the flanges can have wings 76 reducing a gap between the flanges, without the wings 76 impacting against the separators.

In an embodiment, the nut is only designed to withstand large axial forces on the flanges 42 and threaded portions 16, not on the outer body 18. In such an embodiment, when tightened by rotary motion against a surface, the flanges 42 should face the surface to be tightened against. The axial forces pass between flange 42 and threaded portions 16 via the jaws 14 and preferably do not pass through the outer body 18. As the axial forces do not pass between the inner body 12 and outer body 18, they do not cause relative axial motion of the jaws 14 and outer body 18 and so do not significantly affect the radial separation between the jaws 14. Circumferential forces applied to rotate the nut can cause an axial force due to the axial taper of the circumferentially facing surfaces 36 but the taper is relatively slight resulting in a relatively weak axial force.

Figure 4:
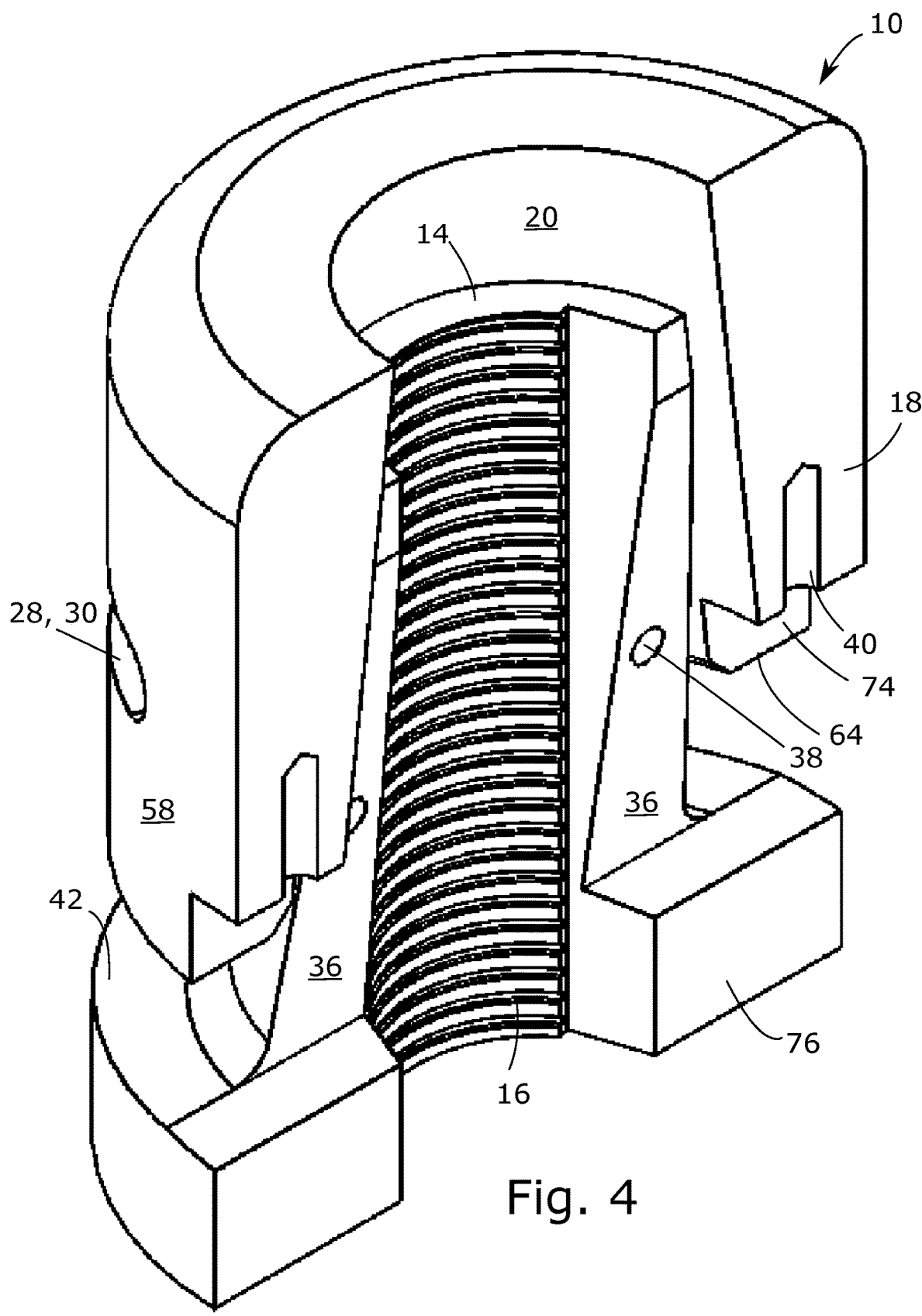
FIG. 4 is an isometric cutaway view of the nut of FIGS. 1-3 with a cutaway plane rotated approximately 90 degrees from the front cutaway plane of FIGS. 1-3.

FIG. 4 is an isometric cutaway view with a cutaway plane rotated approximately 90 degrees from the front cutaway plane of FIGS. 1-3. This view shows a single jaw 14 as well as a portion of outer body 18. FIG. 4 shows the cavity 30 of lock 28 to be a slot in the outer body. FIG. 4 also shows guide holes 40 for receiving fasteners of the separators 24 for connecting the separators 24 to the outer body 18. The separators and fasteners themselves are not shown in FIG. 4. When viewing FIGS. 4 and 5, the slope of the axially tapered circumferentially facing surfaces 36, visible for example in FIG. 3, should be kept in mind to avoid confusion as to the shape of the jaws 14.

Figure 5:
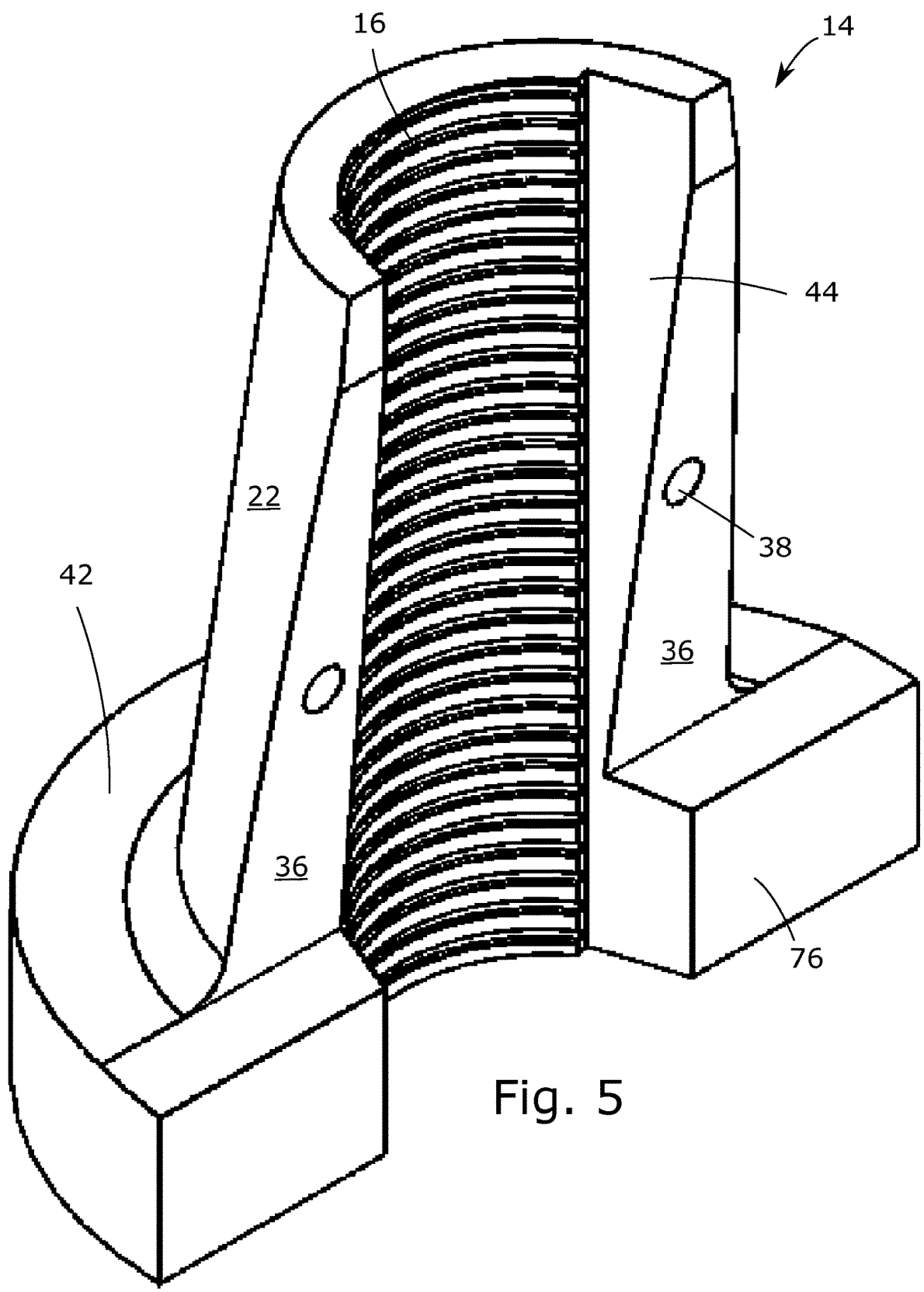
FIG. 5 is an isometric view of a jaw 14 of the nut of FIGS. 1-4, viewed at an angle corresponding to the angle of view of FIG. 4.

FIG. 5 is an isometric view of a jaw 14 only, viewed at an angle corresponding to that of FIG. 4. The axial threaded portion 16 of the jaw 14 in this embodiment is shaped as a rectangular portion of a cylinder. An additional inner portion 44 of the jaw is shaped to not interfere with a threaded rod if the threaded rod is in contact with the axial threaded portion 16. The threaded portion 16 could also take other shapes, including for example covering a full inner surface of the jaw 14.

FIG. 6 is a view of the jaw from the same direction as the section plane of FIG. 4. FIG. 7 is a front view of the jaw from a perpendicular direction from the view of FIG. 6, and corresponding to the cutaway plane of FIGS. 1-3. Slots 32 and 34 are visible in FIG. 7.

Figure 8:
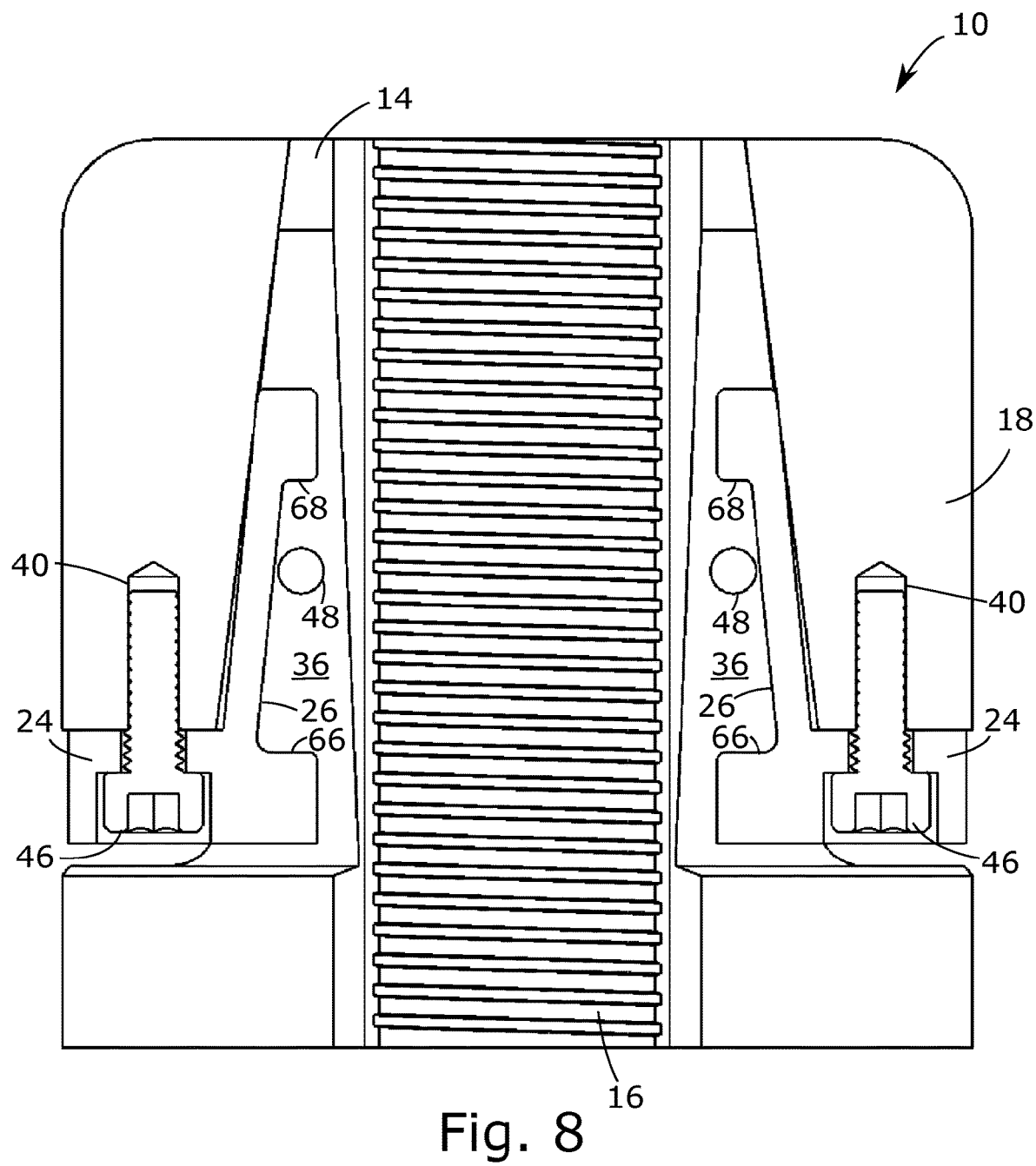
FIG. 8 is a cutaway view of the nut of FIGS. 1-4 using the same cutaway plane as in FIG. 4, and showing the nut from a view direction perpendicular to the plane, and including the separators.

FIG. 8 shows a cutaway view of the nut 10 using the same cutaway plane as in FIG. 4. In this view the separators 24 are shown. In this embodiment, the separators 24 are attached to the outer body 18 using screws 46 in guide holes 40. The separators also each include in this embodiment a recess 26 to accommodate an alignment pin 48 which connects between the jaws. The recess 26 allows a limited range of motion for the alignment pin 48 and thus the jaws 14, so that contact of the alignment pin 48 with wide end shelf 66 the separator 24 serves to bound axial motion of the jaws 14 relative to outer body 18 in the direction where the jaws 14 are forced apart by the separator 24. In the direction of axial motion where the jaws are forced together, when a tapered rod of suitable size is in place the axial motion is preferably bounded by the forcing of the jaws into contact with the threaded rod. When no threaded rod is in place within the jaws, axial motion of the inner body relative to the outer body can be from various means. In one example, contact of the alignment pin 48 with the separator 24 on wide end shelf 66 and on narrow end shelf 68 could bound the axial motion of the jaws 14 in both directions. In another example, contact of flange 42 with end 64 could also bound axial motion in the direction of tightening of the jaws being forced together. In an exemplary embodiment, axial motion in the direction where the jaws 14 are forced together by the tapered axial channel defined by the inner surface 20 of the outer body 18 is bounded by a taper locking effect of the surfaces 20 and 22 and the surfaces 62 and 36 which causes the jaws to effectively jam in place when moved in the maximum axial extent in the direction of being forced together by the tapered axial channel. Pin 48 contacts separator 24 on its lower shelf (the thicker shelf).

Figure 9:
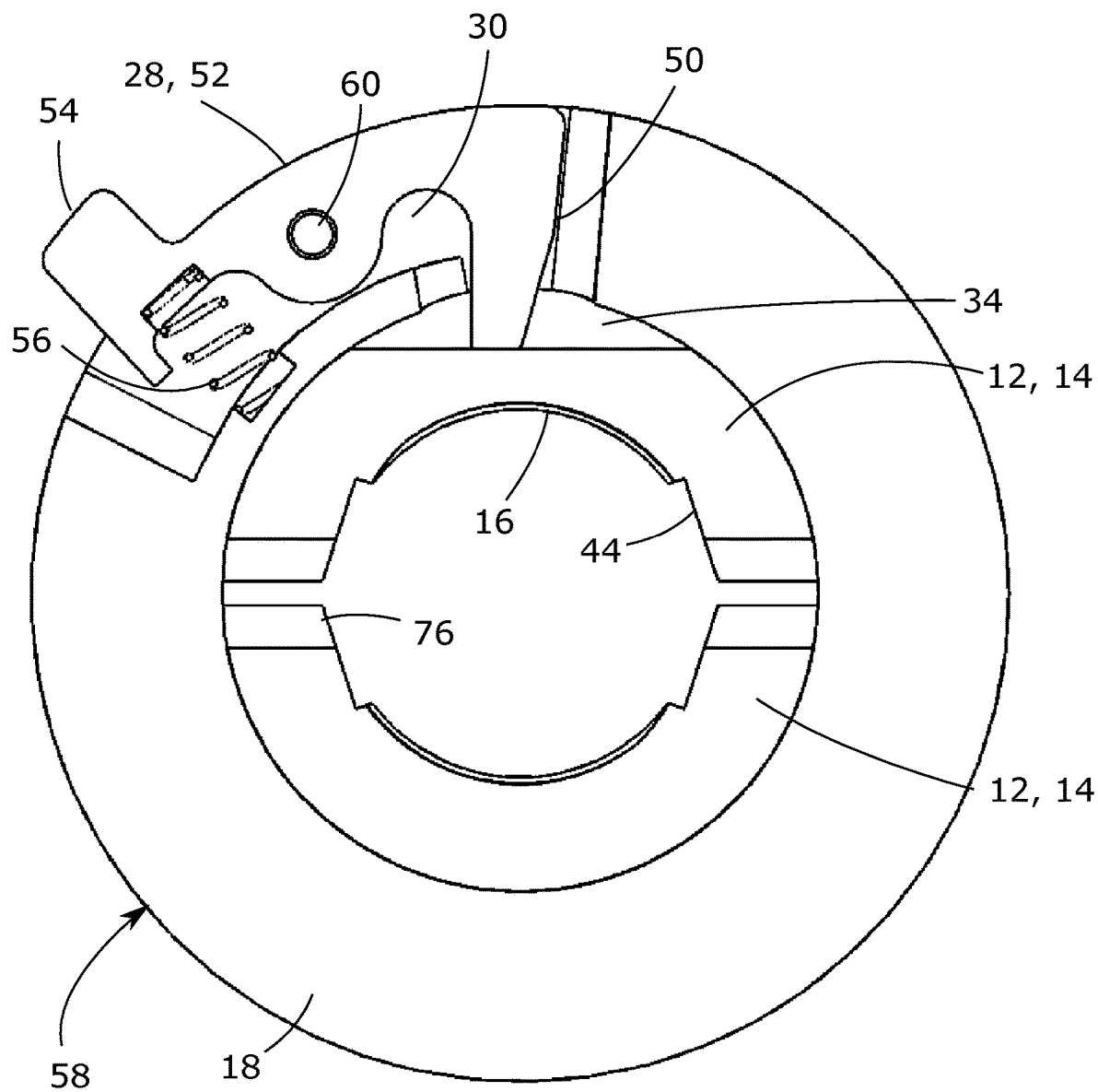
FIG. 9 is an axial section view of the nut of FIGS. 1-4 and 8, not showing the separators but including a lock.

An exemplary locking mechanism for lock 28 is shown in FIG. 9, which shows an axial section through the lock. A locking pin 50 is movable within the outer body 18, here within cavity 30, for insertion into the slots 32 and 34 in the inner body 12, one for each locking position of the lock. The locking pin 50 is in this embodiment at one end of a first class lever 52. The lever 52 is hingedly movable about fulcrum 60. At another end of the lever 52 is a button 54. When the locking pin 50 is in a slot 32 or 34, the button 54 extends out of the outer surface 58 of the outer body 18 so a user can press the button 54 to retract the locking pin 50 from the slot 32 or 34. The lock 28 can also comprise a spring 56 to bias the lever 52 to insert the locking pin 50 into the slot 32 or 34 to enter into a corresponding locking position. This helps the lock 28 enter into a locking position when a slot 32 or 34 is aligned with the locking pin 50, and to remain in a locking position until a user presses the button 54. In FIG. 9 only one jaw 14 has a slot 34. While in this embodiment only one jaw has slots 32 and 34, the other jaw or any additional jaws may also have these slots for interchangeability of parts and the ability to insert the inner body 12 into the outer body 18 in different orientations.

Figure 10:
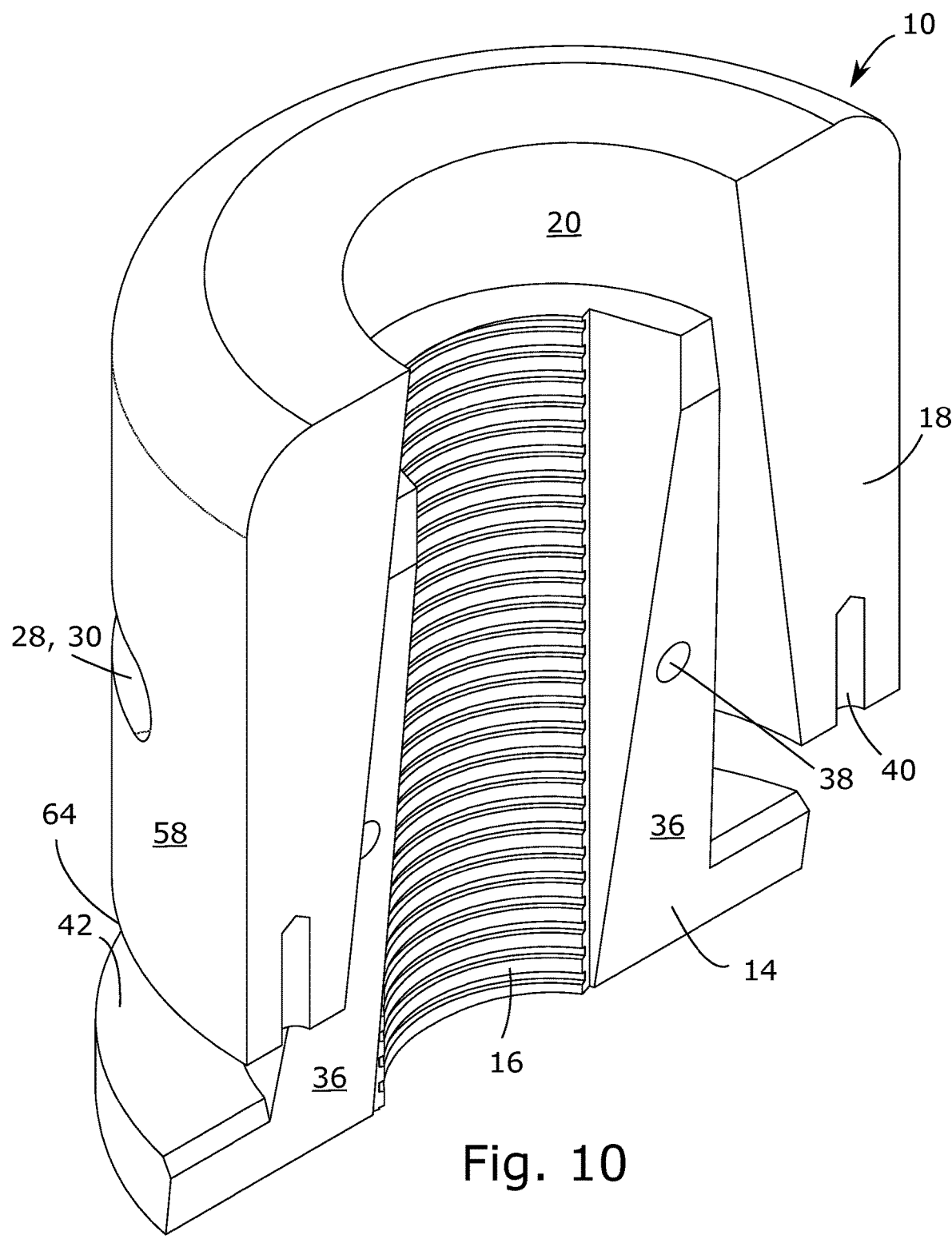
FIG. 10 is an isometric cutaway view of an alternative embodiment of a split nut, from a view corresponding to that shown in FIG. 4.

FIG. 10 shows an alternative embodiment of a split nut, with a view corresponding to that shown in FIG. 4. In this embodiment there is no slot in the outer body 18 to receive the separators (not shown in this figure); the separators instead extend between the flanges 42 of the jaws 14, the flanges not having wings to narrow the gap between them. This embodiment is shown as shaped so that the flange 42 can come into contact with end 64 of the outer body, but this is not preferred as axial forces on flange 42 can bend the flange, and the bending can cause the flange 42 to push on the outer body 18 and shear the locking pin. This contact could however be prevented from shearing the locking pin if flange 42 were sufficiently rigid or the locking mechanism allowed sufficient movement to accommodate the movement of the outer body 18 relative to the inner body 12 induced by the bending of the flange 42 into the end 64 of the outer body. In the embodiment of FIGS. 1-9, the gap between the flange 42 and end 64 of the outer body helps prevent the flange from impacting on and imparting force on the outer body 18.

The split nut 10 shown in FIGS. 1-9 or FIG. 10 may be assembled by first assembling the outer body 18 and lock 28 without the separators 24, and then assembling the inner body 12 by inserting the alignment pins 48 between jaws 14. The inner body can be combined with the outer body by holding the separators 24 between the jaws 14, in contact with surfaces 36 and with the alignment pins 48 in the recesses 26 of the separators 24, while this whole inner assembly is inserted into the outer body 18. The jaws are then held open and the separators 24 fastened into position on the outer body 18 by tightening screws 46 using a tool reaching the screws 46 through a radial separation between the flanges 42 or through an axial separation between flange wings 76 and separators 24.

The embodiment shown can be used simply with one hand as described as follows. When the nut is not on a threaded rod, the user can hold the outer surface 58 with one finger on the button 54, and orient the nut to allow the inner body 12 to fall into the desired position by gravity. This is made easier if the locking positions are at the ends of the axial range of motion of the device, as is the case in the embodiment shown, but in an embodiment with non-terminal locking position, these non-terminal locking positions could still be reached using gravity by releasing the button as the inner body 12 moves so that the locking pin 50 is reengaged by the spring 56 as locking pin 50 reaches a slot. When the nut is on a threaded rod, the user can press the button and move the nut relative to the rod to achieve the same effect. Even when the jaws are in a radially separated position so that the nut and threaded rod can be moved freely relative to one another axially, a side force can still be applied to engage the threads of one of the jaws with the threaded rod. The user can also hold the split nut 10 in their hand with their index finger or thumb and index finger on the flange 42 and their other fingers around the outer surface 58. The user can manipulate the inner body 12 relative to the outer body 18 using the fingers on the flange 42. This is especially easy when moving the flange 42 towards the outer body 18, which corresponds to tightening the nut around the threaded rod, where the flange is axially outside the end 64 of the outer body 18 at which the tapered axial channel is widest.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A nut for attachment on a threaded rod, the nut comprising:
    an outer body having an inner surface defining a tapered axial channel;
    an inner body arranged within the tapered axial channel, and the inner body having an axial internal thread, the inner body split into at least two jaws in an axial direction, the jaws being axially movable within the tapered axial channel;
    the outer body including a separator arranged between the jaws to guide the jaws against the inner surface of the tapered axial channel;
    a lock arranged to lock the jaws in an axial position at which the jaws are sufficiently close to force the inner body into threaded engagement with the threaded rod; and
    a locating connector connected between the jaws, the locating connector comprising an alignment pin extending between the jaws, and the separator defining a recess arranged around the alignment pin, axial motion of the jaws within the outer body being constrained by contact of the alignment pin with the separator.

2. The nut of claim 1 in which the tapered axial channel is generally circular in cross section.

3. The nut of claim 2 in which the inner surface of the outer body is shaped as a truncated cone.

4. The nut of claim 1 in which the inner body has an outer surface generally corresponding in shape to the inner surface of the outer body.

5. The nut of claim 1 in which the outer body has an outer surface that is generally circular in cross section.

6. The nut of claim 5 in which the outer surface of the outer body is cylindrical in shape.

7. The nut of claim 1 in which the separator bears against axially tapered circumferentially-facing surfaces of the jaws.

8. The nut of claim 7 in which the separator has axially tapered circumferentially-facing surfaces corresponding in taper to and bearing against the axially tapered circumferentially-facing surfaces of the jaws.

9. The nut of claim 1 in which the jaws each comprise a respective flange extending radially outward axially outside of an end of the outer body at which the tapered axial channel is widest.

10. The nut of claim 1 in which the lock comprises a locking pin movable within the outer body and arranged for insertion into a slot in the inner body when the jaws are in the axial position at which the jaws are sufficiently close to force the inner body into threaded engagement with the rod.

11. The nut of claim 10 in which the lock comprises a spring arranged to bias the locking pin into the slot in the inner body when the jaws are in the axial position at which the jaws are sufficiently close to force the inner body into threaded engagement with the threaded rod.

12. The nut of claim 10 in which the locking pin is part of a first end of a first class lever, a second end of the first class lever forming a button extending out of an outer surface of the outer body when the locking pin is inserted into the slot in the inner body.

13. The nut of claim 1 in which the lock is also arranged to lock the jaws in an additional axial position at which the threaded rod can be moved freely axially between the jaws.

14. The nut of claim 1 in which the lock comprises a locking pin movable within the outer body and arranged for insertion into a first slot in the inner body when the jaws are in the axial position at which the jaws are sufficiently close to force the inner body into threaded engagement with the threaded rod, and arranged for insertion into a second slot in the inner body when the jaws are in an additional axial position at which the threaded rod can be moved freely axially between the jaws.

15. The nut of claim 14 in which the lock comprises a spring arranged to bias the locking pin into the first slot in the inner body when the jaws are in the axial position at which the jaws are sufficiently close to force the inner body into threaded engagement with the threaded rod, and to bias the locking pin into the second slot in the inner body when the jaws are in the additional axial position at which the threaded rod can be moved freely axially between the jaws.

16. The nut of claim 14 in which the locking pin is part of a first end of a first class lever, a second end of the first class lever forming a button extending out of an outer surface of the outer body when the locking pin is inserted into the first slot in the inner body or the second slot in the inner body.

17. A nut for attachment on a threaded rod, the nut comprising:
    an outer body having an inner surface defining a tapered axial channel, the tapered axial channel being generally circular in cross section;
    an inner body arranged within the tapered axial channel, and the inner body having an axial internal thread, the inner body split into at least two jaws in an axial direction, the jaws being axially movable within the tapered axial channel;
    the outer body including a separator arranged between and bearing against axially tapered surfaces of the jaws to guide the jaws against the inner surface of the tapered axial channel; and
    a lock arranged to lock the jaws in an axial position at which the jaws are sufficiently close to force the inner body into threaded engagement with the threaded rod.

18. The nut of claim 17 in which the inner surface of the outer body is shaped as a truncated cone.

19. The nut of claim 17 in which the inner body has an outer surface generally corresponding in shape to the inner surface of the outer body.

20. The nut of claim 17 in which the outer body has an outer surface that is generally circular in cross section.

21. The nut of claim 20 in which the outer surface of the outer body is cylindrical in shape.

22. The nut of claim 17 further comprising a locating connector connected between the jaws.

23. The nut of claim 22 in which the locating connector comprises an alignment pin extending between the jaws.

24. The nut of claim 23 in which the separator defines a recess arranged around the alignment pin, axial motion of the jaws within the outer body being constrained by contact of the alignment pin with the separator.

25. The nut of claim 17 in which the separator has axially tapered circumferentially-facing surfaces corresponding in taper to and bearing against the axially tapered circumferentially-facing surfaces of the jaws.

26. The nut of claim 17 in which the jaws each comprise a respective flange extending radially outward axially outside of an end of the outer body at which the tapered axial channel is widest.

27. The nut of claim 17 in which the lock comprises a locking pin movable within the outer body and arranged for insertion into a slot in the inner body when the jaws are in the axial position at which the jaws are sufficiently close to force the inner body into threaded engagement with the rod.

28. The nut of claim 27 in which the lock comprises a spring arranged to bias the locking pin into the slot in the inner body when the jaws are in the axial position at which the jaws are sufficiently close to force the inner body into threaded engagement with the threaded rod.

29. The nut of claim 27 in which the locking pin is part of a first end of a first class lever, a second end of the first class lever forming a button extending out of an outer surface of the outer body when the locking pin is inserted into the slot in the inner body.

30. The nut of claim 17 in which the lock is also arranged to lock the jaws in an additional axial position at which the threaded rod can be moved freely axially between the jaws.

31. The nut of claim 17 in which the lock comprises a locking pin movable within the outer body and arranged for insertion into a first slot in the inner body when the jaws are in the axial position at which the jaws are sufficiently close to force the inner body into threaded engagement with the threaded rod, and arranged for insertion into a second slot in the inner body when the jaws are in an additional axial position at which the threaded rod can be moved freely axially between the jaws.

32. The nut of claim 31 in which the lock comprises a spring arranged to bias the locking pin into the first slot in the inner body when the jaws are in the axial position at which the jaws are sufficiently close to force the inner body into threaded engagement with the threaded rod, and to bias the locking pin into the second slot in the inner body when the jaws are in the additional axial position at which the threaded rod can be moved freely axially between the jaws.

33. The nut of claim 31 in which the locking pin is part of a first end of a first class lever, a second end of the first class lever forming a button extending out of an outer surface of the outer body when the locking pin is inserted into the first slot in the inner body or the second slot in the inner body.

34. A nut for attachment on a threaded rod, the nut comprising:
an outer body having an inner surface defining a tapered axial channel, the tapered axial channel being generally circular in cross section;
an inner body arranged within the tapered axial channel, and the inner body having an axial internal thread, the inner body split into at least two jaws in an axial direction, the jaws being axially movable within the tapered axial channel;
the outer body including a separator arranged between the jaws to guide the jaws against the inner surface of the tapered axial channel; and
a lock arranged to lock the jaws in an axial position at which the jaws are sufficiently close to force the inner body into threaded engagement with the threaded rod, the lock comprising a locking pin movable within the outer body and arranged for insertion into a slot in the inner body when the jaws are in the axial position at which the jaws are sufficiently close to force the inner body into threaded engagement with the rod and a spring arranged to bias the locking pin into the slot in the inner body when the jaws are in the axial position at which the jaws are sufficiently close to force the inner body into threaded engagement with the threaded rod.

35. The nut of claim 34 in which the inner surface of the outer body is shaped as a truncated cone.

36. The nut of claim 34 in which the inner body has an outer surface generally corresponding in shape to the inner surface of the outer body.

37. The nut of claim 34 in which the outer body has an outer surface that is generally circular in cross section.

38. The nut of claim 37 in which the outer surface of the outer body is cylindrical in shape.

39. The nut of claim 34 further comprising a locating connector connected between the jaws.

40. The nut of claim 39 in which the locating connector comprises an alignment pin extending between the jaws.

41. The nut of claim 40 in which the separator defines a recess arranged around the alignment pin, axial motion of the jaws within the outer body being constrained by contact of the alignment pin with the separator.

42. The nut of claim 34 in which the separator has axially tapered circumferentially-facing surfaces corresponding in taper to and bearing against axially tapered circumferentially-facing surfaces of the jaws.

43. The nut of claim 34 in which the jaws each comprise a respective flange extending radially outward axially outside of an end of the outer body at which the tapered axial channel is widest.

44. The nut of claim 34 in which the locking pin is part of a first end of a first class lever, a second end of the first class lever forming a button extending out of an outer surface of the outer body when the locking pin is inserted into the slot in the inner body.

45. The nut of claim 34 in which the lock is also arranged to lock the jaws in an additional axial position at which the threaded rod can be moved freely axially between the jaws.

46. The nut of claim 34 in which the locking pin is arranged for insertion into a second slot in the inner body when the jaws are in an additional axial position at which the threaded rod can be moved freely axially between the jaws.

47. The nut of claim 46 in which the spring is arranged to bias the locking pin into the second slot in the inner body when the jaws are in the additional axial position at which the threaded rod can be moved freely axially between the jaws.

48. The nut of claim 46 in which the locking pin is part of a first end of a first class lever, a second end of the first class lever forming a button extending out of an outer surface of the outer body when the locking pin is inserted into the first slot in the inner body or the second slot in the inner body.

49. A nut for attachment on a threaded rod, the nut comprising:
an outer body having an inner surface defining a tapered axial channel;
an inner body arranged within the tapered axial channel, and the inner body having an axial internal thread, the inner body split into at least two jaws in an axial direction, the jaws being axially movable within the tapered axial channel;

the outer body including a separator arranged between the jaws to guide the jaws against the inner surface of the tapered axial channel; and a lock comprising a locking pin movable within the outer body and arranged for insertion into a first slot in the inner body when the jaws are in a first axial position at which the jaws are sufficiently close to force the inner body into threaded engagement with the threaded rod, and arranged for insertion into a second slot in the inner body when the jaws are in a second axial position at which the threaded rod can be moved freely axially between the jaws.

50. The nut of claim 49 in which the inner surface of the outer body is shaped as a truncated cone.

51. The nut of claim 49 in which the inner body has an outer surface generally corresponding in shape to the inner surface of the outer body.

52. The nut of claim 49 in which the outer body has an outer surface that is generally circular in cross section.

53. The nut of claim 52 in which the outer surface of the outer body is cylindrical in shape.

54. The nut of claim 49 further comprising a locating connector connected between the jaws.

55. The nut of claim 54 in which the locating connector comprises an alignment pin extending between the jaws.

56. The nut of claim 55 in which the separator defines a recess arranged around the alignment pin, axial motion of the jaws within the outer body being constrained by contact of the alignment pin with the separator.

57. The nut of claim 49 in which the separator has axially tapered circumferentially-facing surfaces corresponding in taper to and bearing against axially tapered circumferentially-facing surfaces of the jaws.

58. The nut of claim 49 in which the jaws each comprise a respective flange extending radially outward axially outside of an end of the outer body at which the tapered axial channel is widest.

59. The nut of claim 49 in which the locking pin is part of a first end of a first class lever, a second end of the first class lever forming a button extending out of an outer surface of the outer body when the locking pin is inserted into the first slot in the inner body.

60. The nut of claim 49 in which the lock comprises a spring arranged to bias the locking pin into the first slot in the inner body when the jaws are in the axial position at which the jaws are sufficiently close to force the inner body into threaded engagement with the threaded rod, and to bias the locking pin into the second slot in the inner body when the jaws are in the additional axial position at which the threaded rod can be moved freely axially between the jaws.

61. The nut of claim 49 in which the locking pin is part of a first end of a first class lever, a second end of the first class lever forming a button extending out of an outer surface of the outer body when the locking pin is inserted into the first slot in the inner body or the second slot in the inner body.

* * * * *